US006082687A

United States Patent [19]

Kump et al.

[11] Patent Number: 6,082,687

[45] Date of Patent: Jul. 4, 2000

[54] FLAG HOLDER AND LABEL HOLDER

[75] Inventors: Daniel J. Kump, Gates Mills; Stephen D. Wamsley, Lakewood; Paul A. Mueller, Wadsworth, all of Ohio

[73] Assignee: Fasteners For Retail, Inc., Cleveland, Ohio

[21] Appl. No.: 09/078,164

[22] Filed: May 13, 1998

[51] Int. Cl.[7] .............................. F21L 3/08; F21L 15/08; F16L 3/08; B42F 7/00

[52] U.S. Cl. .............................. 248/220.41; 248/224.51; 211/57.1; 211/59.1

[58] Field of Search ........................ 248/220.21, 220.22, 248/220.31, 221.11, 223.41, 225.11, 220.41, 316.1, 309.1, 224.51, 224.61, 224.7; 40/658, 666, 649

[56] References Cited

U.S. PATENT DOCUMENTS

| | | | |
|---|---|---|---|
| D. 294,113 | 2/1988 | Smyth, III | D8/373 |
| D. 316,729 | 5/1991 | Crowley | D20/10 |
| 626,684 | 9/1961 | Farndon | 248/224.51 |
| 1,077,792 | 8/1967 | Hankin | 248/224.51 |
| 1,720,309 | 7/1929 | Wakefield | 224/547 |
| 2,239,978 | 4/1941 | Sanford | 248/224.51 |
| 2,610,014 | 9/1952 | Ananson | 248/226 |
| 2,975,578 | 8/1963 | Swish | 248/225.11 |
| 3,021,105 | 2/1962 | Swislow | 248/224.51 |
| 3,452,954 | 7/1969 | Lucietto et al. | 248/220.5 |
| 3,491,820 | 1/1970 | Ostling | 248/225.11 |
| 3,525,493 | 8/1970 | Chrietzberg | 248/224 |
| 3,927,315 | 12/1975 | Werry | 240/52.1 |
| 4,018,341 | 4/1977 | Jarecki | 248/223.41 |
| 4,246,710 | 1/1981 | Mixer | 40/16.4 |
| 4,319,731 | 3/1982 | Pfeifer | 248/223.4 |
| 4,539,766 | 9/1985 | Fast | 40/22 |
| 4,557,064 | 12/1985 | Thompson | 40/10 |
| 4,713,899 | 12/1987 | Fast | 40/10 |
| 4,718,626 | 1/1988 | Thalenfeld et al. | 248/225.1 |
| 4,995,182 | 2/1991 | Fast | 40/649 |
| 5,086,958 | 2/1992 | Nagy | 248/224.51 |
| 5,109,992 | 5/1992 | Miller | 211/59.1 |
| 5,109,993 | 5/1992 | Hutchison | 248/223.41 |
| 5,275,367 | 1/1994 | Frye | 248/205.3 |
| 5,346,166 | 9/1994 | Valiulis | 248/220.4 |
| 5,415,370 | 5/1995 | Valiulis | 248/220.4 |
| 5,485,930 | 1/1996 | Rushing | 211/59.1 |
| 5,678,795 | 10/1997 | Henry et al. | 248/220.41 |
| 5,683,003 | 11/1997 | Gebka | 211/57.1 |
| 5,702,008 | 12/1997 | Thalenfeld et al. | 211/57.1 |
| 5,722,625 | 3/1998 | Kenney | 248/220.41 |
| 5,871,118 | 2/1999 | Lyle | 248/223.41 |

OTHER PUBLICATIONS

*Fasteners for Retail* 1997 Buyers Guide.

*Instachange Displays Limited* Catalog, pp. 59 (ca. 1996).

Fasteners for Retail, 1994 Buyers Guide; p. 14, 30, 37, Aug. 1, 1994.

*Primary Examiner*—Derek J. Berger
*Assistant Examiner*—Michael Nornberg
*Attorney, Agent, or Firm*—Fay, Sharpe, Fagan, Minnich & McKee, LLP

[57] ABSTRACT

A flag and label holder assembly for holding signs or labels for displaying prices and other information on merchandise display racks and shelves. The flag and label holder includes a base, a support member and a holder for selectively accommodating a sign. The support member can be pivotable in relation to the base via a hinge. The support member further includes a rib extending from the support member and positioned between a pair of L-shaped walls. The rib engages the holder. The base further includes a hook and, spaced therefrom, a finger which are both secured to the bottom surface of the base. The hook and finger engage a wall surface adjacent a respective hole in a display rack or shelf. The holder further includes at least one fin extending inwardly from an inside surface of each wall of the holder. The fins are overlapping to secure a sign within the holder. In an alternative embodiment, the holder includes a clip and a rib which hold the sign or label in place. In a third embodiment, the clip is defined by a pair of spaced legs which form a slot to receive the sign or label.

18 Claims, 5 Drawing Sheets

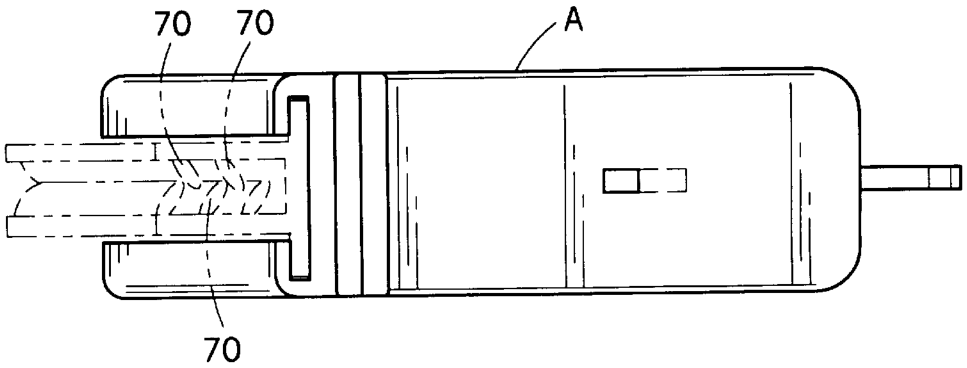
FIG.2
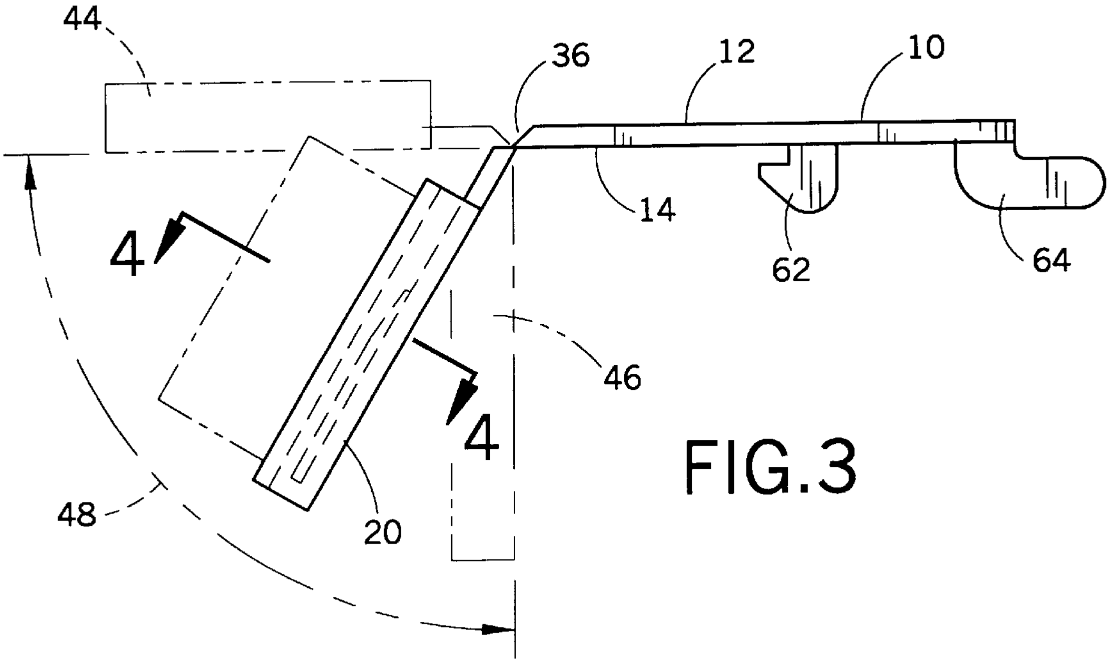
FIG.3
FIG.4
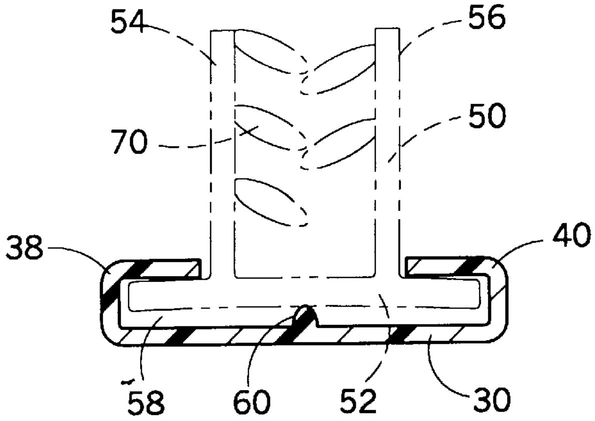

FLAG HOLDER AND LABEL HOLDER

BACKGROUND OF THE INVENTION

The present invention relates generally to flag holders and label holders. More particularly, it relates to improved flag holders and label holders for use with display racks and shelves employed in retail stores for displaying merchandise. The holders enable signs or labels with prices and other information to be displayed adjacent the merchandise held on the display racks and shelves.

Businesses use a wide variety of devices to display products and sale prices to consumers. One of the known ways to display products in a retail environment involves the use of horizontally oriented display shelves. Often in displaying products on shelves, it is difficult to prominently display sale tags or price signs due to a lack of space at the front edge of a shelf or display rack. As a result, it is desirable to provide a label and flag holder which is mounted on the shelf or display rack for easy visibility of a sign by a consumer and which allows the sign to be readily attached to or removed from the shelf or display rack.

Price tag display hangers and label holders used in merchandising displays have been common for some time. One known device is shown in U.S. Pat. No. 5,683,003. This device is a label holder with a transparent label cover which enables the label holder to carry adhesive or non-adhesive labels. The device further includes a foot and post mounting to provide cantilever support for the device. A disadvantage of this device is that the label is not easily removable. The label cover must be removed in order to allow removal of a label. Another disadvantage of this device is that the size of labels to be displayed is limited by the size of the label cover. Also, the foot and post mounting arrangement is disadvantageous from the standpoint that it allows the front end of the device to be tipped up, making possible an inadvertent disengagement of the device from the shelf it is attached to.

Accordingly, it has been considered desirable to develop new and improved flag holders and label holders which would overcome the foregoing difficulties and others while providing better and more advantageous overall results.

BRIEF SUMMARY OF THE INVENTION

The present invention relates to a flag holder and label holder for use with a display rack for displaying retail products and merchandise and for use with signs displaying prices, etc. to consumers.

More specifically, the label and flag holder may be attached to a display rack or shelf and used to display labels and signs. The signs and labels may list prices, product information, the existence of a sale on the product, etc. The signs may be displayed in a flag orientation for viewing from the side or in a label orientation for direct viewing.

In the first preferred embodiment, a flag holder assembly comprises a base, a support member, and a holder. The base is comprised of a top surface, a bottom surface, and first and second ends. The support member comprises a planar body, and a pair of L-shaped walls and an end wall extending therefrom. The planar body comprises a first end and a second end and is connected to the base by a hinge which extends from the second end of the base to the first end of the planar body. The L-shaped walls are oriented so as to face each other. The end wall protrudes from the second end of the planar body in a direction perpendicular to the pair of L-shaped walls. The end wall and the L-shaped walls form a socket to accommodate the holder. The holder includes a back wall, and first and second walls which are spaced apart and protrude from the back wall.

If desired, the support member can be pivotable in relation to the base via the hinge between an approximately horizontal orientation parallel to the base and a vertical orientation approximately normal (90°) to the base. The base and the support member can be of one piece and made of a plastic material.

If desired, the support member can further include a rib which extends from the planar body and is positioned between the pair of L-shaped walls. The rib engages the back wall of the holder to urge the holder into frictional engagement with the socket formed by the L-shaped walls and the end walls of the support member.

The base can further include a hook which is secured to the bottom surface of the base. The hook engages a wall surface adjacent a hole in a display rack or shelf.

The base can further include a finger which extends from the bottom surface of the base. The finger also engages a wall surface adjacent a hole in a display rack or shelf. The finger is spaced from the hook. Preferably, the finger and the hook are aligned along the longitudinal axis of the base.

If desired, the holder can further include at least one fin which extends inwardly from an inside surface of the first and second walls. The fins are inwardly angled with the fins overlapping to secure a sign within the holder.

The holder can be made from a co-extended plastic material with the fins made of a more resilient thermoplastic and the first, second and back walls made of a more rigid thermoplastic.

In a second preferred embodiment, a label holder includes a base, a connecting member, and a clip. The base includes a longitudinal axis, a top surface, a bottom surface, a first end and a second end. The connecting member extends from the second end of the base, and is disposed at an angle with respect to the base. The clip is secured to the connecting member. The clip is disposed at a downward angle with respect to the base. The clip includes a planar body with a first end and a second end. A curved body protrudes from the planar body for holding a label or sign.

If desired, the holder can further include a rib which protrudes from the planar body toward the curved body.

The base can further include a hook which is secured to the bottom surface of the base. The hook engages a wall surface adjacent a hole in a display rack or shelf. The base can further include a finger which extends from the bottom surface of the base. The finger also engages a wall surface adjacent a hole in a display rack or shelf. The finger is spaced from the hook. If desired, the hook and finger can be aligned with each other along the longitudinal axis of the base to engage wall surfaces of holes aligned with each other in a display rack or shelf.

In a third preferred embodiment, a flag holder includes a base, a holder, and a connecting member. The base includes a top surface and a bottom surface, and a first end and a second end.

The holder includes a planar body with a first end and a second end, and a pair of spaced walls which protrude from the planar body. The pair of walls extend approximately parallel to each other and form a sign-receiving slot between them for selectively receiving a sign. The connecting member extends between the second end of the base and the first end of the planar body for connecting the base to the planar body.

If desired, the pair of walls can each include an angled base portion, a narrow central portion and a wider inlet portion. The pair of walls of the holder can further include a rib located on the narrow central portion and positioned between the pair of walls. The rib selectively engages a sign.

One advantage of the present invention is the provision of a flag or sign holder assembly having a base, a holder, and a planar body which is connected to the base by a hinge extending between the base and the planar body. The holder is selectively held on the planar body. The holder selectively accommodates a sign.

Another advantage of the present invention is the provision of L-shaped walls and an end wall protruding from a planar body of a flag holder assembly to form a socket for selectively accommodating a holder.

Still another advantage of the present invention is the provision of a flag holder assembly in which a support member is pivotable in relation to a base via a hinge between a horizontal orientation approximately parallel to the base and a vertical orientation approximately normal to the base.

Yet another advantage of the present invention is the provision of a flag holder assembly with a base which includes a hook and a finger, secured to the bottom surface of the base and spaced from each other. These two elements engage a wall surface adjacent a pair of spaced holes in a display rack to securely hold the base to the display rack.

Still yet another advantage of the present invention is the provision of a flag holder assembly which is of unitary construction and includes a base and a holder which extends approximately normal to the base. A pair of spaced walls protrude from the holder and define between them a socket for selectively accommodating a sign.

A further advantage of the present invention is the provision of a flag or sign holder having at least one fin extending inwardly from an inside surface of each of a pair of spaced walls. The fins are inwardly angled and are overlapping to secure a sign within the holder.

A still further advantage of the present invention is the provision of a sign holder of unitary construction including a base, a planar body secured to one end of the base and a curved body protruding from the planar body. The curved body and the planar body cooperate to form a clip and selectively hold a sign.

Still other benefits and advantages of the present invention will become apparent to those skilled in the art upon a reading and understanding of the following detailed specification.

BRIEF DESCRIPTION OF THE DRAWINGS

The invention will take form in certain parts and arrangements of parts, preferred embodiments of which will be described in detail in this specification and illustrated in the accompanying drawings which form a part hereof and wherein:

FIG. 2 is a top elevational view of the flag holder assembly of FIG. 1 in the assembled configuration;

FIG. 3 is a side elevational view of the flag holder assembly of FIG. 2 showing the pivoting of the holder and support member with respect to the base;

FIG. 4 is a cross sectional view of the flag holder assembly of FIG. 3, along line 4—4;

DETAILED DESCRIPTION OF THE PREFERRED EMBODIMENTS

Figure 5:
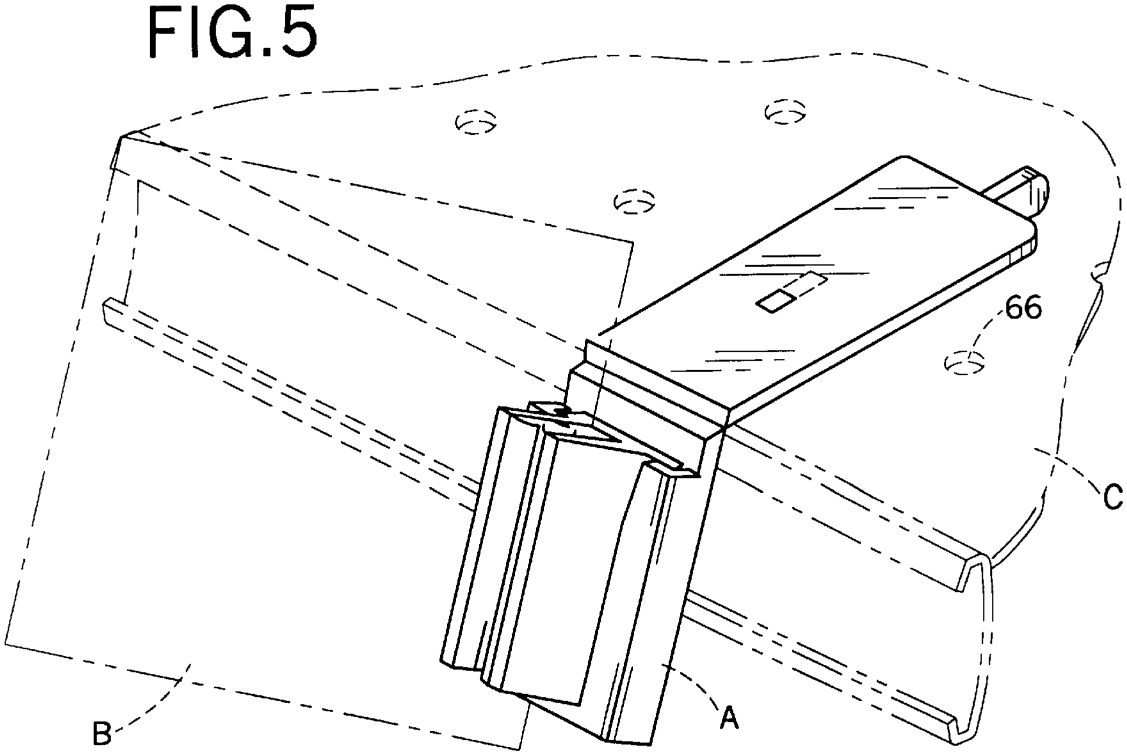
FIG. 5 is a perspective view of the flag holder assembly of FIG. 1 in the assembled configuration when attached to a display shelf and holding a sign.

Referring now to the drawings, wherein the showings are for purposes of illustrating preferred embodiments of this invention only and not for purposes of limiting same, FIG. 2 shows a flag holder assembly A according to a first preferred embodiment of the present invention. As shown in FIG. 5, the flag holder assembly A can be used to hold a sign B for displaying prices, product information, the existence of a sale, etc. to consumers in merchandise and retail product displays. The flag holder assembly A is attached to a display rack or shelf C so that the sign B protrudes in front of the shelf.

Figure 1:
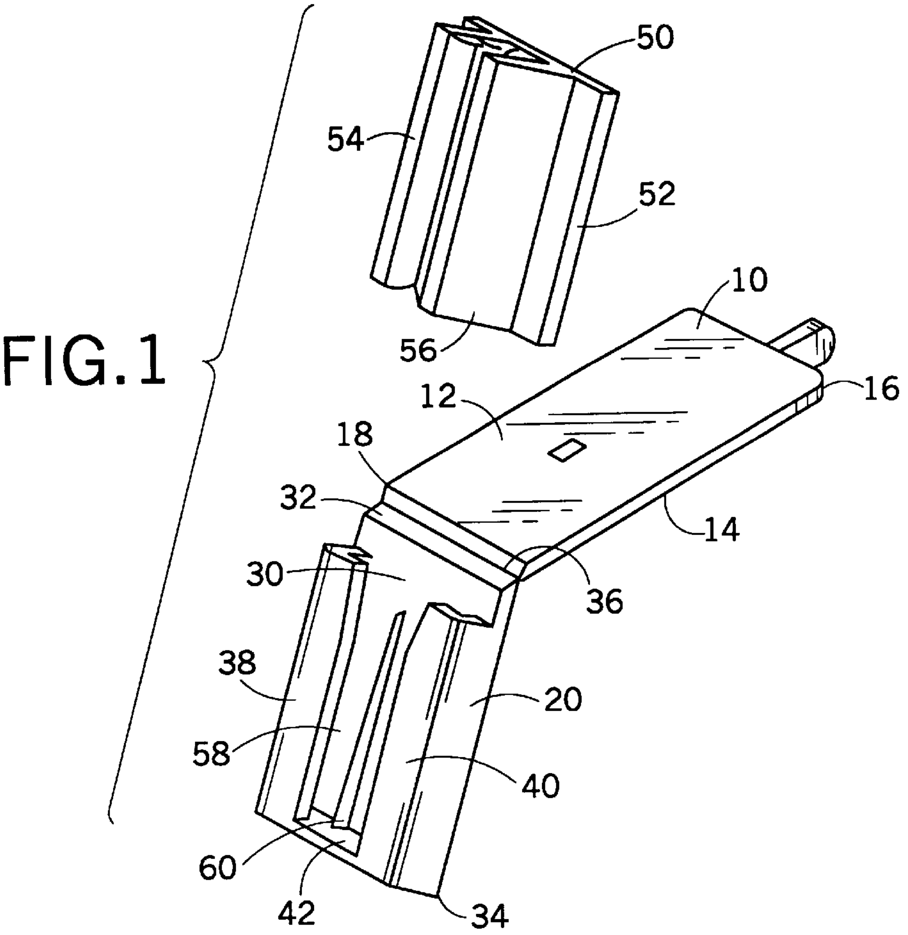
FIG. 1 an exploded perspective view of a flag holder assembly in accordance with a first preferred embodiment of the present invention.

Referring now to FIG. 1, the flag holder assembly includes a base 10, which has a top surface 12, a bottom surface 14, a first end 16 and a second end 18. The flag holder assembly also includes a support member 20. The support member 20 includes a planar body 30 which has a first end 32 and a second end 34. The planar body 30 is connected to the base 10 by a hinge 36. The hinge 36 extends between the second end 18 of the base 10 and the first end 32 of the planar body 30.

The base 10 and support member 20 are preferably made of one piece and are fabricated from a resilient material, preferably a thermoplastic, such as injection molded natural polypropylene.

The support member 20 further includes a pair of L-shaped walls 38, 40 which are oriented so as to face each other. The L-shaped walls 38, 40 extend upwardly from opposed side edges of the planar body 30. The support member 20 also includes an end wall 42 which protrudes upwardly from the second end 34 of the planar body 30 in a direction perpendicular to the longitudinal axes of the pair of L-shaped walls 38, 40.

Referring now to FIG. 3, the support member 20 can be pivoted in relation to the base 10 via the hinge 36 between a horizontal orientation 44 approximately parallel to the base 10 to a vertical orientation 46 approximately normal to the base 10, as shown by the arrow 48.

Referring again to FIG. 1, the flag holder assembly A also includes a holder 50 which is used to selectively accommodate the sign B. The holder 50 includes a back wall 52, a first wall 54 and a second wall 56. The first wall 54 and the second wall 56 are parallel to each other and are spaced apart. They protrude from the back wall 52. The holder 50 is accommodated by a socket 58 formed by the pair of L-shaped walls 38, 40 and the end wall 42 of the support member 20.

If desired, the support member 20 can further include a rib 60 which extends from the planar body 30 and is positioned between the pair of L-shaped walls 38, 40. The rib 60 is wedge-shaped and has a thin end located near the opening in the socket 58 and a thick end located adjacent the end wall 42. Referring now to FIG. 4, the holder 50 engages the rib 60 and the walls forming the socket 58. The rib 60 pushes the holder 50 against the L-shaped walls 38, 40 to frictionally engage the holder 50 and retard its removal from the socket 58.

Referring again to FIG. 3, the base 10 can further include a hook 62 and, spaced therefrom, a finger 64 which both extend from the bottom surface 14 of the base 10. The finger 64 extends rearwardly from the base 10. Referring now to FIG. 5, the hook 62 and the finger 64 each engage a wall surface adjacent a hole 66 in the display rack or shelf C. It is apparent from FIG. 2 that the hook 62 and finger 64 are aligned on the longitudinal centerline of the base 10. The hook 62 is advantageous from the standpoint that it positively locks the base 10 to the shelf C shown in FIG. 5 to retard its removal from the shelf when the assembly A is inadvertently bumped by a shopper passing by the shelf.

If desired, with reference now to FIG. 2 and FIG. 4, the holder 50 can include one or more fins 70 which extend from inside surfaces of the first and second walls 54, 56 of the holder 50. The fins 70 can be inwardly angled and preferably overlap each other to firmly secure the sign B in the holder 50 and retard its removal.

Preferably, the holder 50 is made from a co-extended plastic material. Preferably, the fins 70 are made of a more resilient thermoplastic and the back, first, and second walls 52, 54, 56 are made of a more rigid thermoplastic. In one embodiment, the thermoplastic is a clear polyvinylchloride.

Figure 6:
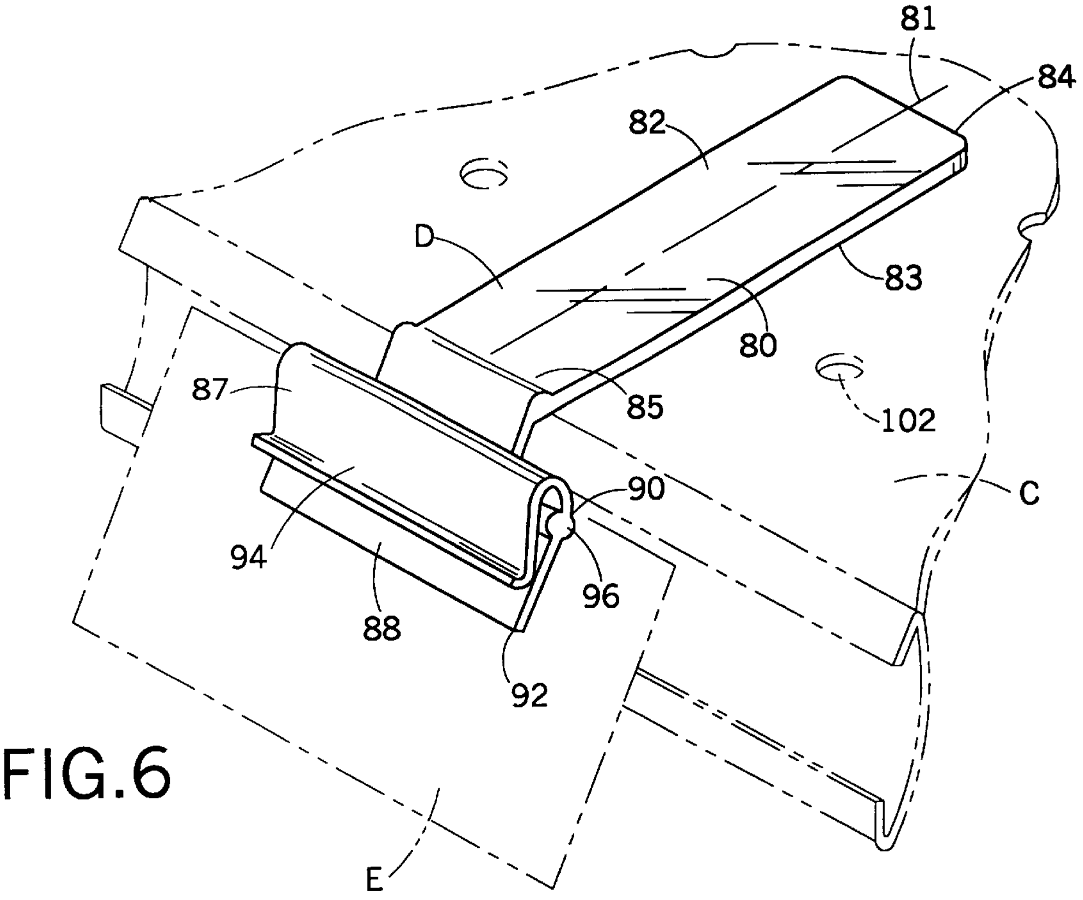
FIG. 6 is a perspective view of a label holder attached to a display shelf and holding a label in accordance with a second preferred embodiment of the present invention.
Figure 7:
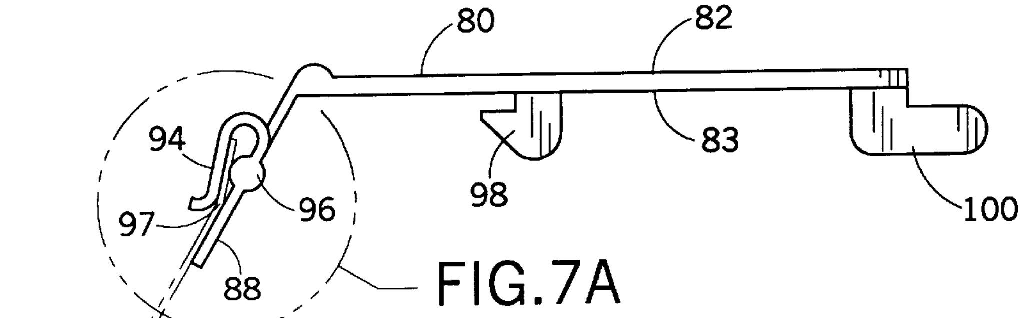
FIG. 7 is a side elevational view of the label holder of FIG. 6.
Figure 7A:
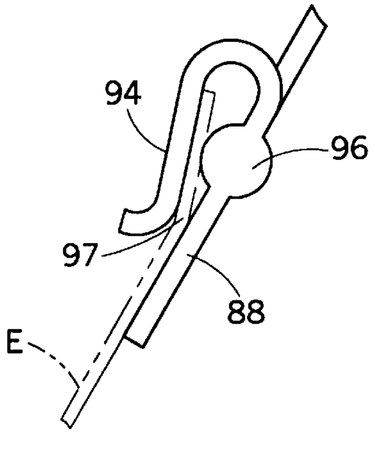
FIG. 7A is an enlarged side elevational view of a portion of the label holder of FIG. 7.

A second preferred embodiment of the label holder is shown in FIGS. 6, 7 and 7A. Referring to FIG. 6, in this embodiment a label holder D includes a base 80. The base 80 has a longitudinal axis 81, a top surface 82, a bottom surface 83, a first end 84 and a second end 85. A connecting member 86 extends from the second end 85 of the base 80 and is disposed at a downward angle with respect to the base 80.

The label holder D further includes a clip 87 which includes a planar body 88 which has a first end 90 and a second end 92. The clip 87 is connected at the first end 90 to the connecting member 86. The clip 87 also includes a curved body 94 which protrudes from the first end 90 of the planar body 88.

Referring to FIG. 7A, if desired, the clip 87 can further include a rib 96 which protrudes from the planar body 88 toward the curved body 94. The rib 96 can extend horizontally along a portion of or along the entire length of the planar body 88 and aids in holding a label E in place by frictionally engaging an upper end of the label with the curved body 94. The curved body 94 and the planar body 88 together form a nip 97. The nip 97 and the reduced thickness area formed between the rib 96 and the curved body 94 both form tight receiving areas for the label which prevent the label from becoming easily detached from the clip 87.

Referring now to FIG. 7, the base 80 can include a hook 98 and, spaced therefrom, a finger 100 which both extend from the bottom surface 83 of the base 80. Referring again to FIG. 6, the hook 98 and the finger 100 each engage a wall surface adjacent a respective hole 102 in the display rack or shelf C.

Preferably, the base 80 and the holder 87 are made of one piece and are fabricated from a suitable conventional plastic material.

Figure 8:
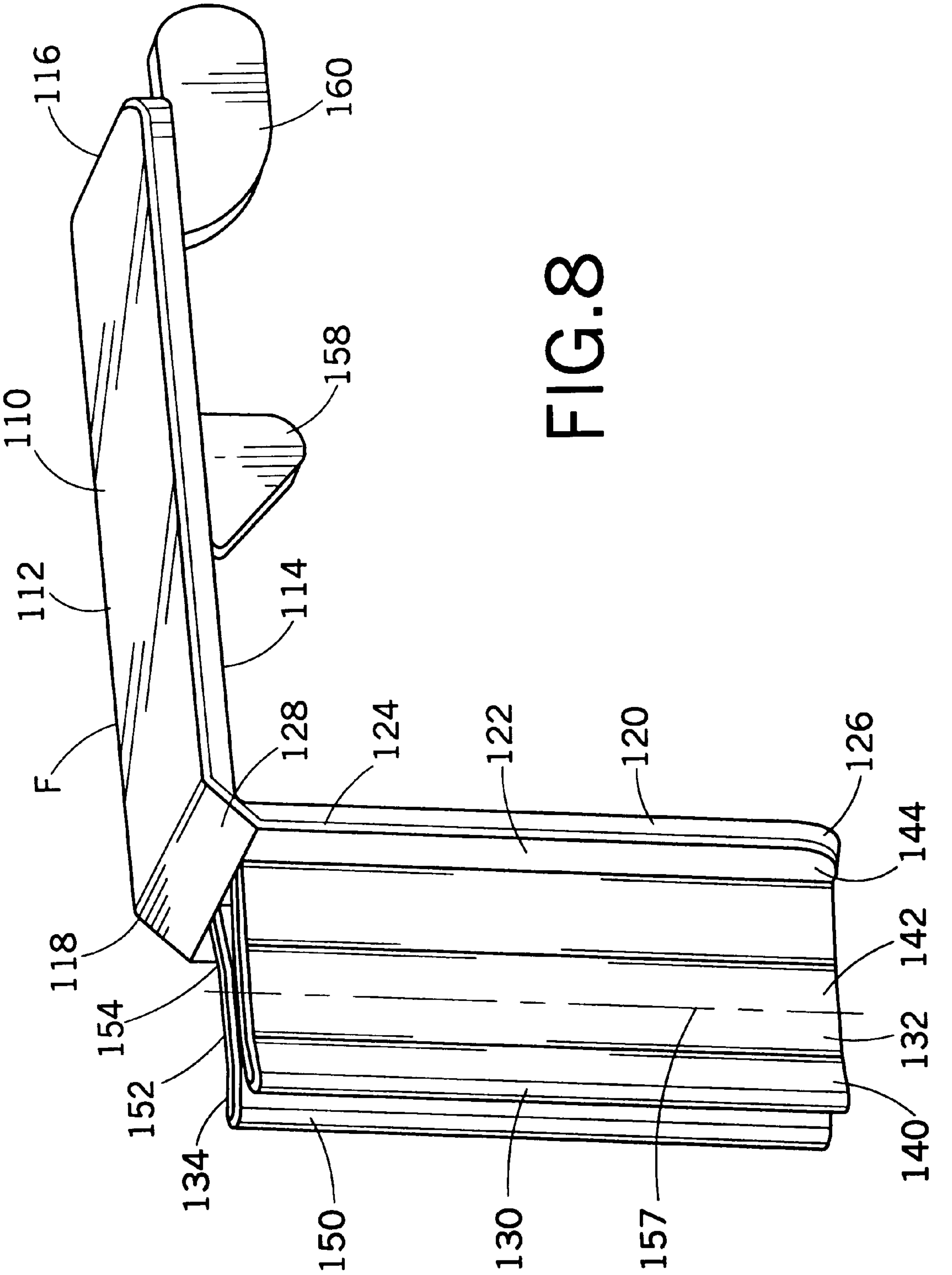
FIG. 8 is a perspective view of a flag holder in accordance with a third preferred embodiment of the present invention; and, FIG. 9 is a top plan view of the flag holder of FIG. 8.
Figure 9:
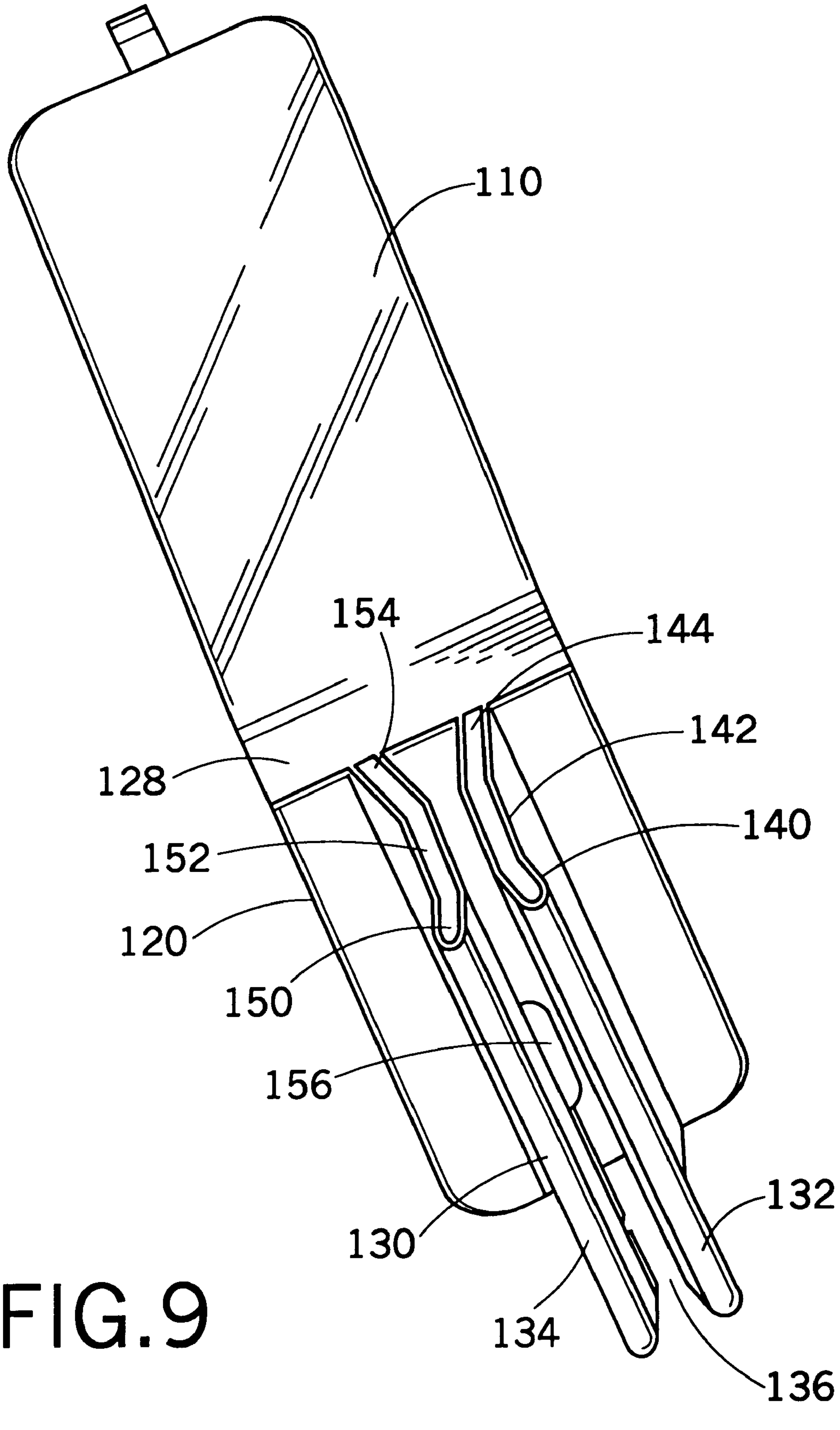

A third preferred embodiment of a flag holder is shown in FIGS. 8 and 9. Referring now to FIG. 8, a flag holder F includes a base 110 having a top surface 112, a bottom surface 114, a first end 116 and a second end 118. The flag holder F also includes a holder 120 which includes a planar body 122 with a first end 124 and a second end 126. The planar body 122 is connected at the first end 124 to a connecting wall 128. The connecting wall 128 extends between the second end 118 of the base 110 and the planar body first end 124.

The holder 120 includes a clip 130 which protrudes from the planar body 122 and includes a pair of spaced legs 132, 134. Referring to FIG. 9, the legs 132, 134 extend approximately normal to each other and form between them a sign-receiving slot 136.

If desired, the leg 132 can include an inlet wall section 140, a central wall section 142, and a base wall section 144. Similarly, the leg 134 can include an inlet wall section 150, a central wall section 152, and a base wall section 154. The several wall sections cooperate to form a tapered inlet portion, a narrow central portion and a wider base portion of the slot 136.

If desired, the clip 130 can include a rib 156 which is located on the narrow central portion of the slot 136 and is positioned between the pair of central wall sections 142, 152 and extends from one of them. The rib 156 may be perpendicular to or parallel to a longitudinal axis 157, shown in FIG. 8, of the legs 132, 134. The rib 156 can extend along a portion of or along the entire length of the central wall section 142, 152. The rib 156 narrows the slot 136 so that a sign is pushed against one of the central wall sections 142, 152. The sign is frictionally engaged by the rib 156 and one of the central wall sections 152, 152. The rib 156 retards removal of the sign from the slot 136.

Referring again to FIG. 8, the base 110 can include a hook 158 and, spaced therefrom, a finger 160 which both extend from the bottom surface 114 of the base 110. The hook 158 and the finger 160 engage a wall adjacent respective holes in a display rack or shelf.

The invention has been described with reference to several preferred embodiments. Obviously, alterations and modifications will occur to others upon a reading and understanding of the specification. It is intended to include all such modifications and alterations insofar as they come within the scope of the appended claims or the equivalents thereof.

Having thus described the present invention, it is now claimed:

1. A flag holder assembly comprising:

a base, said base including a top surface and a bottom surface, a first end and a second end;

a support member connected to said base, said support member comprising:

a planar body with a first end and a second end, said planar body being connected to said base by a hinge extending between said second end of said base and said first end of said planar body substantially across the entire width of the base and the planar body, a pair of L-shaped walls which are oriented so as to face each other, said L-shaped walls extending from said planar body, and an end wall protruding from said second end of said planar body in a direction perpendicular to said pair of L-shaped walls; and, a holder for selectively accommodating a sign, said holder comprising a back wall, a first wall and a second wall, which are spaced apart, protruding from said back wall, said L-shaped walls and said end wall of said support member cooperating to form a socket for selectively accommodating said holder, said socket having an open end and a closed end opposite said open end; wherein said support member further comprises a wedge-shaped rib extending from said planar body and positioned between said pair of L-shaped walls, said rib engaging said back wall of said holder, said rib having a relatively thin end located adjacent said open end of said socket and a relatively thick end located adjacent said closed end of said socket.

2. The flag holder assembly of claim 1 wherein said support member is pivotable in relation to said base via said hinge between a horizontal orientation parallel to said base and a vertical orientation approximately normal to said base.

3. The flag holder assembly of claim 1, wherein said base further comprises a hook and a finger extending from said bottom surface of said base, said finger being spaced from said hook, wherein said hook comprises a stem and barb and said finger comprises a stem and protrusion, and wherein said barb of said hook and said protrusion of said finger extend away from each other.

4. The flag holder assembly of claim 1, wherein said holder further comprises at least one fin extending inwardly from an inside surface of each of said first and second walls, said at least one fin on each wall being inwardly angled with the fins overlapping to secure a sign within said holder.

5. The flag holder assembly of claim 1, wherein said base and said support member are of one piece and are made of a plastic material.

6. The flag holder assembly of claim 1, wherein said holder is made from a co-extended plastic material with fins being made of a more resilient thermoplastic and said first, second and back walls made of a more rigid thermoplastic.

7. The flag holder assembly of claim 1 wherein said L-shaped walls are tapered at a top end of said L-shaped walls to form an enlarged opening to facilitate insertion of said holder into said socket.

8. A flag holder, comprising:

a base, said base including a top surface, a bottom surface, a first end and a second end;

a holder, wherein said holder comprises a planar body with a first end and a second end;

a connecting member extending between said second end of said base and said first end of said planar body for connecting said base to said planar body;

a hook and a finger secured to said bottom surface of said base, wherein said hook, which comprises a stem and a barb, and said finger, which comprises a stem and a protrusion, are spaced from each other and wherein said barb of said hook and said protrusion of said finger extend away from each other; and, wherein said holder further comprises a pair of spaced walls protruding from said planar body, said pair of walls extending approximately parallel to each other and forming a sign-receiving slot between them for selectively receiving an associated sign and a rib, said rib having a relatively thin end located adjacent a first end of said sign-receiving slot and a relatively thick end located adjacent a second end of said sign-receiving slot, wherein said base and said holder are made of resilient material.

9. The flag holder of claim 8 wherein said base further comprises at least one protrusion extending from said bottom surface of said base, said at least one protrusion engaging a wall surface adjacent a hole in an associated display rack to hold said base to the associated display rack.

10. The flag holder of claim 8 wherein said base and said holder are of one piece.

11. The flag holder of claim 8, wherein said connecting member comprises a hinge extending between said second end of said base and said first end of said planar body substantially across the entire width of the base and the planar body.

12. The flag holder assembly of claim 8 wherein said pair of spaced walls comprise L-shaped walls, said L-shaped walls are tapered to form an enlarged opening.

13. A flag holder assembly, comprising:

a base, said base including a top surface and a bottom surface, a first end and a second end;

a support member connected to said base, said support member comprising:

a planar body with a first end and a second end, said planar body being connected to said base by a hinge extending between said second end of said base and said first end of said planar body, a pair of L-shaped walls which are oriented so as to face each other, said L-shaped walls extending from said planar body, an end wall protruding from said second end of said planar body in a direction perpendicular to said pair of L-shaped walls, and a longitudinally disposed rib extending from said planar body and positioned between said pair of L-shaped walls; and a holder for selectively accommodating a sign, said holder comprising a back wall, a first wall and a second wall, which are spaced apart, protruding from said back wall, said L-shaped walls and said end wall of said support member cooperating to form a socket for selectively accommodating said holder, said socket having an open end and a closed end, wherein said rib is wedge shaped and has a relatively thin end located adjacent the open end of the socket and a relatively thick end located adjacent the closed end of the socket.

14. The flag holder assembly of claim 13 wherein said base further comprises a hook secured to said bottom surface of said base.

15. The flag holder assembly of claim 14 wherein said base further comprises a finger extending from said bottom surface of said base, said finger being spaced from said hook comprises a stem and barb, and said finger comprises a stem and protrusion, and wherein said barb of said hook and said protrusion of said finger extend away from each other.

16. The flag holder assembly of claim 13, wherein said holder further comprises at least one fin extending inwardly from an inside surface of each of said first and second walls, said at least one fin on each wall being inwardly angled with the fins overlapping to secure a sign within said holder.

17. The flag holder assembly of claim 13 wherein said L-shaped walls are tapered at a top end of said L-shaped walls to form an enlarged opening to facilitate insertion of said holder into said socket.

18. The flag holder of claim 13, wherein said hinge extends between said second end of said base and said first end of said planar body substantially across the entire width of the base and the planar body.

* * * * *